July 16, 1940. T. E. JACKSON 2,208,261

GAS PRESSURE REGULATOR

Filed Nov. 15, 1937 2 Sheets—Sheet 1

INVENTOR.
Thomas E. Jackson
BY
Barnes, Kisselle, Laughlin & Raisch
ATTORNEYS

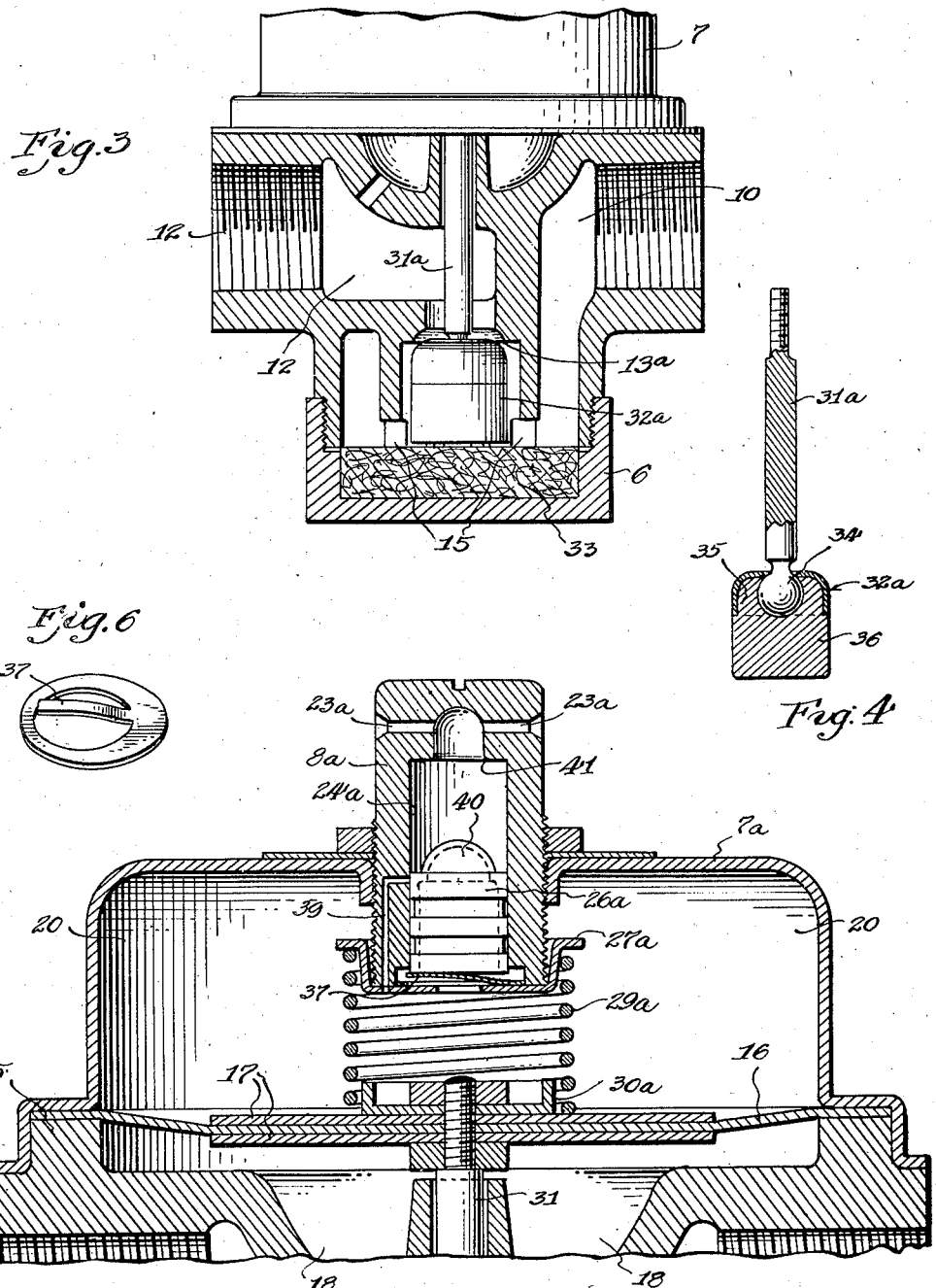

Patented July 16, 1940

2,208,261

UNITED STATES PATENT OFFICE 2,208,261

GAS PRESSURE REGULATOR

Thomas E. Jackson, Detroit, Mich., assignor, by direct and mesne assignments, to Sherman-Jackson-Roose Company, Detroit, Mich., a corporation of Michigan Application November 15, 1937, Serial No. 174,604

9 Claims. (Cl. 50—23)

This invention relates to a gas pressure regulator for gas burning appliances.

It is well known that gas main pressure rises and falls in accordance with variations in domestic and commercial consumption. This variation in main pressure changes the height and intensity of gas flames in lighters and burners and causes difficulty when a well regulated flame is desired. In the case of pilot lights on gas ranges and other appliances it is desirable that they be set for as low a gas consumption as possible since they are burning constantly.

An object of the present invention is to provide a gas pressure regulator which may be attached to a gas appliance when it is sold and which may be adjusted by the manufacturer for the proper pressure to be maintained in the particular appliance on which it is to be used.

It is a further object of the invention to provide a gas pressure regulator which will maintain a constant pressure in the gas supply to the appliance or appliances in connection with which it is used, and which is so arranged that it will prevent fouling of the burners and thereby obviate the necessity of adjusting the regulator over a long period of years.

An important feature of the invention is a self-contained safety valve arrangement whereby ventilation of the constant pressure control valve is obtained with no danger of gas escaping into the room in which the regulator is located. With this arrangement it becomes unnecessary to provide means for conducting escaped gases to an escapement burner or a remote ventilating point.

In the drawings:

Fig. 3 is a partial sectional view of a modification of the invention.

Fig. 4 is a detail section of the modified valve.

Fig. 5 illustrates a modified safety valve.

Fig. 6 is a detail plan of a spring used in the modification of Fig. 5.

Figure 1:
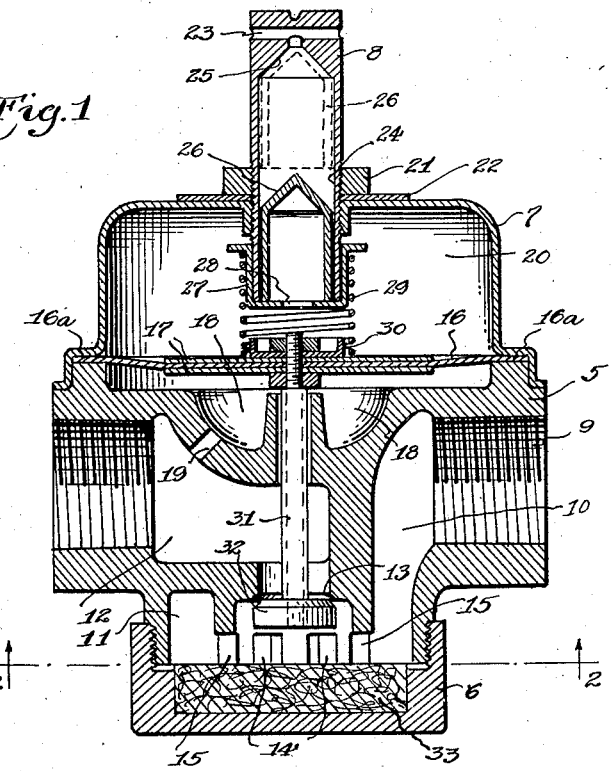
Fig. 1 illustrates a vertical sectional view of the apparatus.

The modification of the invention which is to be used for purposes of disclosure consists generally of a main housing 5, a filter cap 6, a diaphragm housing 7, and a ventilating valve housing 8.

The main housing 5 is provided with an inlet opening 9 which admits to an entrance chamber 10. The entrance chamber 10 is open to an annular chamber 11. An outlet chamber 12 is open to the annular chamber 11 through a valve port 13 located centrally of the main housing 5. In order for gas to flow from the chamber 11 to the chamber 12, it must pass through openings 14 which are formed by projections 15 on the center portion of the housing and by the separator cap 6 which will later be described. The top portion of the main housing 5 is covered by a diaphragm 16 which is reinforced at its center portion by washers 17. Between the diaphragm and main housing is formed a circular chamber 18 which is open to the outlet chamber 12 through a port 19.

Above the diaphragm 16 a chamber 20 is formed by the diaphragm housing 7. This housing 7 is fastened to the main housing 5 by bolts (not shown) which firmly clamp and seal the periphery of the diaphragm 16 as at 16a in Fig. 1. The ventilating valve housing 8 consists of a tube which is threaded into the housing 7 and which may be adjusted in the housing 7 by loosening a lock nut 21. A washer 22 is provided to seal the entrance of the tube 8 into the housing 7. The ventilating tube 8 is provided with an atmospheric port 23 which opens to a cylindrical chamber 24. This chamber 24 is provided with a conical valve seat 25 at its top portion.

A hollow, bullet-shaped valve piston 26, having a point coinciding in configuration with the valve seat 25, is located in the central opening 24 of the ventilating tube 8. This valve piston 26 is preferably loosely fitting in the valve recess 24 in order that atmosphere may normally sift through from the outlet vent to prevent the diaphragm from becoming air bound. This design also permits free movement of the piston in the valve recess. This piston 26 is preferably formed of an extremely light metal such as aluminum in order that a pressure slightly above atmospheric will lift the piston to the top of the recess.

A cup shaped retaining member 27, having a central opening 28, is fitted around the lower portion of the ventilating tube 8 to hold the valve piston 26 within the tube. This retaining member 27 is held in place by a spring 29, the lower portion of which rests upon a diaphragm washer 17 and around a centering member 30. Supported at the center portion of the diaphragm 16 is an elongated valve stem 31 upon which is formed, at the lower portion, a valve piston 32 dimensioned to cooperate with the valve port 13. The top portion of the valve stem 31 is preferably threaded in order that nuts may be used to fasten it to the diaphragm 16 and to compress the diaphragm between the washers 17 thereby sealing the aperture in the diaphragm through which the valve stem projects.

Figure 2:
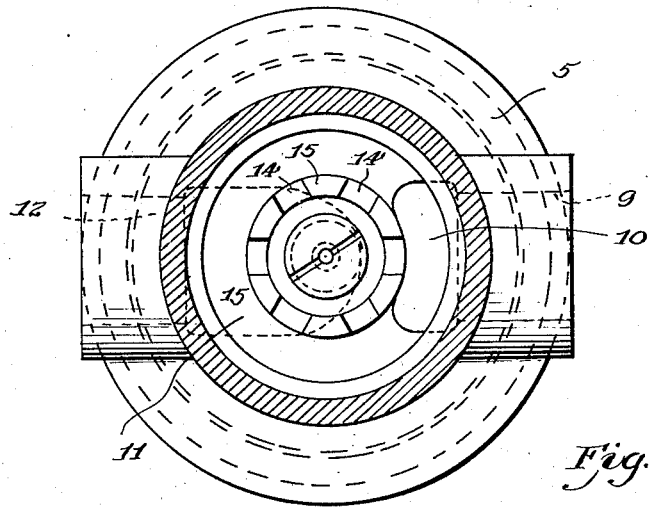
Fig. 2 is a sectional view taken on the line 2—2 of Figs. 1 and 3.

The separator cap 6 is threaded onto the lower portion of the main housing 5 and is provided with a separator pad 33 which reaches to the projections 15 on the main housing. If desired an oil bath may be substituted for the pad 33. In Fig. 2, the spacing of the projections 15 may be seen.

In the operation the spring 29 is set by adjustment of the ventilating tube 8 so that the pressure required to move the diaphragm upward will be substantially the pressure that is desired at the gas consuming outlet, as for example, a gas burner. Gas enters the main housing 5 through the opening 9 and passes to the pressure regulator or reducing valve 32 and the chamber 12 through chambers 10 and 11 and small openings 14. This places the incoming gas in contact with the separator 33. Assuming that the gas from the city gas main is at a pressure of seven ounces, which is higher than a desired outlet pressure of, for example, three ounces, gas will pass through the port 19 and act on the diaphragm 16. Since the pressure in the mains is higher than the three ounce pressure required to compress the spring 29, the diaphragm will be moved upwardly and the valve piston 32 will tend to close the port 13. A reduction of pressure, however, in the chamber 12 due to the fact that gas is being consumed at the outlet, will permit the valve 32 to open the port 13 thereby admitting more high pressure gas and raising the pressure in the chamber 12 again up to the required three ounce limit. In this manner an equilibrium is established and a constant pressure is maintained in the outlet chamber 12 and in the conduits of a gas appliance which is connected to the chamber 12. The separator 33 collects all dirt and dust from the incoming gas so that the valves and burners will not become fouled. Thus no adjustments or cleaning are necessary for long periods.

The chamber 20 above the diaphragm 16 is normally vented to the atmosphere through the opening 28 in the retaining cup 27 and around the valve piston 26. However, in case of a failure of the diaphragm 16, the gas pressure acting on the light valve piston 26 will force it to the top of the valve recess 24 (dotted lines, Fig. 1) where it will close the valve recess 25 and prevent any escape of gas into the atmosphere around the pressure regulator. Under these circumstances the valve port 13 will be left open and the higher main pressure will be admitted to the outlet chamber 12 and to any attached gas burner outlet. The resulting higher flame will apprise the operator of the rupture of the diaphragm. However, under normal circumstances, the predetermined constant operating pressure can be maintained in the gas appliance and the fluctuations in the pressure of the city gas main will not affect the operating pressure of the appliance, since the maximum pressure required by an appliance is lower than the minimum city main pressure.

A modified form of valve to be used with the invention is illustrated in Fig. 3. In this embodiment the reducing valve is composed of a valve stem 31a and a valve piston 32a. The valve stem 31a differs from that shown in Fig. 1 in that it has a ball formation 34 at its lower end which has a diameter slightly larger than that of the stem (see Fig. 4). The modified valve piston 32a is formed of a stainless steel shell 35 having a rounded upper portion provided with an aperture which will receive the stem 31a but which is smaller than the ball 34. The remainder of the valve piston 32a is formed of a heavy metal 36 which is preferably melted into the shell to form a pivot socket around the ball 34 and which may extend below the shell 35 to furnish additional weight to the valve. The valve seat 13a in this modification is preferably formed with a curvature similar to that of the shell 35. The housing 5 is slightly longer at its lower end to accommodate the additional length of the piston. The formations 15 and the filter cap 6 are identical with those of Fig. 1.

The functions of this modified valve are several. In the first place, it provides a positive shut-off by reason of the fact that the pivoting valve piston 32a takes care of misalignment. The stainless steel shell prevents corrosion and the weighted portion makes for a positive smooth action of the valve with no possibility of chattering. In addition the pivoted valve piston relieves the diaphragm of any strain due to misalignment.

A modified form of safety valve is illustrated in the partial section view of Fig. 5. A housing 8a is formed with a longitudinal cylindrical recess 24a in which is snugly but slidably fitted an extremely light hollow piston 26a. This piston is supported by a very flexible leaf spring 37 (see Fig. 6) which in turn rests on the retaining collar 27a. In the wall of the housing 8a is a by-pass passageway 39 opening at its lower end to the chamber 20 and having its other end normally blocked by the top portion of the piston 26a. Resting on the top of the piston 26a is a separate loose spherical projection valve 40 which is adapted to contact and close an annular valve seat 41 at the top of the cylindrical recess 24a. The recess 24a is normally open to the atmosphere through venting ports 23a.

In the operation of this modified safety valve the top of the piston 26a will normally be open to the atmosphere. In case of a movement upward of the diaphragm 16 the piston will also move upwardly and in case of the slightest downward movement of the diaphragm 16, the piston 26a will be pulled downwardly against the spring 37 and will open the top end of the bypass 39 thereby admitting atmosphere to the chamber 20 above the diaphragm. It will thus be seen that the piston 26a normally serves as a breather valve without the necessity of having an atmospheric bypass which is always open. With this arrangement even the slightest leakage of gas through the diaphragm 16 will not be admitted to the atmosphere surrounding the pressure regulator because the bypass 39 is closed except during those brief times when the diaphragm is moving downward and during these periods the atmosphere is entering the bypass 39. Any tendency for the leakage to increase the pressure in the chamber 20, above atmosphere, will result in the raising of the piston 26a to the top of the housing 8a thereby closing the atmospheric opening entirely. Since the ball valve 40 is simply resting on the top of the valve piston 26a, a tight closure of the upper portion of the recess 24a will be permitted regardless of any misalignment between the valve seat 41 and the cylindrical recess 24a.

The features of this modification which should be emphasized are that the combined valve piston 26a and the ball valve 40 are extremely light so that under normal conditions the up and down movement thereof will substantially coincide with that of the diaphragm. In this connection it is important also that the spring 37 be extremely flexible.

I claim:

1. In a gas pressure regulator, a housing provided with inlet and outlet ports, a pressure regulator interposed between said ports comprising a valve stem and a weighted valve piston swiveled on said valve stem, a pressure responsive member operatively connected with said valve and subject on one side to pressure in said outlet port, and a safety breather valve positioned on the other side of said diaphragm, said breather valve having a normal atmospheric opening adapted to be closed by pressure above atmospheric.

2. In a gas pressure regulator of the type having a housing provided with inlet and outlet ports, a pressure regulator valve interposed between said ports, and a pressure responsive member operatively connected with said valve and subject on one side at all times to pressure in said outlet port, a safety breather valve positioned on the other side of said member comprising a valve housing having a valve recess and an atmospheric opening substantially at one end, and a floating valve piston closely fitted with and slidable in, and normally positioned at the other end of said recess, said piston being adapted to pulsate within said recess with normal movement of said pressure responsive member.

3. In a gas pressure regulator of the type having a housing provided with inlet and outlet ports, a pressure regulator valve interposed between said ports, and a spring backed pressure responsive member operatively connected with said valve and subject on one side to pressure in said outlet port, a safety breather valve positioned on the other side of said member comprising a valve housing having a vertical valve recess and an atmospheric opening substantially at the top, a floating cylindrical valve piston slidable in, and normally positioned at the bottom of said recess, said housing having a bypass adjacent the piston in normal position and adapted normally to bypass atmosphere to said pressure responsive member, and a shaped projection on the top of said piston, said piston and said projections being adapted respectively to close said bypass and said opening when shifted upwardly by pressure above atmospheric.

4. In a gas pressure regulator of the type having a housing provided with inlet and outlet ports, a pressure regulator valve interposed between said ports, and a spring backed pressure responsive member operatively connected with said valve and subject on one side to pressure in said outlet port, a safety breather valve positioned on the other side of said member comprising a valve housing having a vertical valve recess and a valve seat opening substantially at the top, a floating valve piston slidable in said recess, said housing having a bypass normally blocked by said piston, said piston being adapted to move back and forth under normal pulsations of said member and to close said bypass and said valve seat opening when the safety valve side of said member is subjected to pressures above atmospheric.

5. In a gas pressure regulator of the type having a housing provided with inlet and outlet ports, a pressure regulator valve interposed between said ports, a pressure responsive member operatively connected with said valve and subject on one side to pressure in said outlet port, and means tending to move said valve to open position, a safety breather valve positioned on the other side of said member comprising a valve housing having a recess open to said member and to the atmosphere, a movable sealing member in said recess, a bypass around said sealing member, and a light spring member acting on said sealing member and normally tending to render said bypass ineffective but allowing said bypass to open upon the slightest reduction of pressure on the breather valve side of said pressure responsive member.

6. In a gas pressure regulator of the type having a housing provided with inlet and outlet ports, a pressure regulator valve interposed between said ports, a pressure responsive member operatively connected with said valve and subject on one side to pressure in said outlet port, and means tending to move said valve to open position, a safety breather valve positioned on the other side of said member comprising a valve housing having a substantially vertical valve recess open to said member and to the atmosphere, a movable sealing member in said recess, an atmospheric bypass around said sealing member normally blocked by said sealing member and resilient means supporting said sealing member.

7. In a fluid pressure regulator of the type having a main housing provided with inlet and outlet ports, a pressure regulator valve interposed between said ports, and a pressure responsive member operatively connected with said valve and subjected on one side to pressure in said outlet port, a safety breather valve on the other side of said diaphragm comprising a valve housing adjustably sealed in said main housing, and a floating valve piston in said housing, and a spring bearing at one end on said valve housing and acting on said pressure regulator valve whereby pressure in said outlet port may be regulated.

8. In a fluid pressure regulator of the type having a main housing provided with inlet and outlet ports, a pressure regulator valve interposed between said ports, a pressure responsive member operatively connected with said valve and subject on one side to pressure in said outlet port, and means tending to move said valve to open position, a safety breather valve positioned on the other side of said member comprising a valve housing having a recess open to said member and to the atmosphere, a movable sealing member in said recess, an atmospheric bypass between said valve housing recess and said pressure responsive member, and means movably supporting said sealing member whereby said sealing member normally blocks said bypass but allows said bypass to open upon the slightest reduction in pressure on the breather valve side of said pressure responsive member.

9. In a fluid pressure regulator of the type having a man housing provided with inlet and outlet ports, a pressure regulator valve interposed between said ports, a pressure responsive member operatively connected with said valve and subject on one side to pressure in said outlet port, and means tending to move said valve to open position, a safety breather valve positioned on the other side of said member comprising a valve housing having a recess open to said member and to the atmosphere, a movable sealing member in said recess comprising a piston having a relatively tight slidable fit with said recess, an atmospheric bypass between said valve recess and said pressure responsive member, and a resilient member supporting said sealing member wnereby said sealing member normally blocks said bypass but allows said bypass to open upon the slightest reduction in pressure on the breather valve side of said pressure responsive member.

THOMAS E. JACKSON.